United States Patent
Nagaraj et al.

(10) Patent No.: US 10,721,186 B1
(45) Date of Patent: Jul. 21, 2020

(54) PACKET PROCESSING WITH PER-CPU (CENTRAL PROCESSING UNIT) FLOW TABLES IN A NETWORK DEVICE

(71) Applicant: Fortinet, Inc., Sunnyvale, CA (US)

(72) Inventors: Chandrasekhar Nagaraj, Bangalore (IN); Siva Rama Krishna Rao Yogendra Jupudi, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 16/370,907

(22) Filed: Mar. 30, 2019

(51) Int. Cl.
| | |
|---|---|
| *H04L 12/743* | (2013.01) |
| *H04L 12/863* | (2013.01) |
| *H04W 84/12* | (2009.01) |
| *H04L 12/935* | (2013.01) |

(52) U.S. Cl.
CPC ...... *H04L 49/3009* (2013.01); *H04L 45/7453* (2013.01); *H04L 47/621* (2013.01); *H04W 84/12* (2013.01)

(58) Field of Classification Search
CPC ... H04L 45/7453; H04L 47/621; H04W 84/12
See application file for complete search history.

(56) References Cited

U.S. PATENT DOCUMENTS

| | | | |
|---|---|---|---|
| 7,346,059 B1* | 3/2008 | Garner | H04L 12/4625 370/235 |
| 9,385,957 B1* | 7/2016 | Neugebauer | H04L 45/7457 |
| 2018/0107759 A1* | 4/2018 | Cheng | G06F 16/9014 |
| 2018/0205653 A1* | 7/2018 | Wang | H04L 47/2441 |
| 2018/0285151 A1* | 10/2018 | Wang | G06F 9/5083 |

* cited by examiner

*Primary Examiner* — Gbemileke J Onamuti
(74) *Attorney, Agent, or Firm* — Law Office of Dorian Cartwright; Dorian Cartwright

(57) ABSTRACT

A plurality of network packets is received at an input network interface of the network device coupled to the data communication network. The network packets are stored in a plurality of network packets in a hardware queue of a plurality of hardware queues dedicated to a CPU of a plurality of CPUs in accordance with a flow assigned to the network packet. Responsive to successfully identifying a stored hash matching the hash result in the hash table, an associated flow entry is fetched, and the network packet is forwarded to a fast processing path. Responsive to not successfully identifying a stored hash matching the hash result in the hash table, the hash is stored in the hash table, and the network packet is forwarded to the slow processing path. The network packet at an output network interface of the network device according to the flow entry.

8 Claims, 5 Drawing Sheets

US 10,721,186 B1

PACKET PROCESSING WITH PER-CPU (CENTRAL PROCESSING UNIT) FLOW TABLES IN A NETWORK DEVICE

FIELD OF THE INVENTION

The invention relates generally to computer networking improvements, and more specifically, to packet processing with per-CPU (central processing unit) flow tables in a network device.

BACKGROUND

Packet processing in WLAN controllers involve reception on a network interface, application of custom processing rules, and delivery back to the network interface transmission to a destination. The processing path is time and CPU intensive with due, in part, to an IP network stack.

Some controllers implement a fast path to forward packets from reception directly to transmission, based on an identified flow. The flow is typically identified by five tuple of source IP address, destination IP address, source port, destination port, and protocol. Some controllers further implement a CPU for each network interface card for additional processing improvements.

However, controllers typically have common sources and/or destinations, and thus can be indistinguishable. As a result, flow tables have been implemented as they are based on the inner contents of network packets rather than the conventional five tuples. One problem with the flow table is that locks are applied to maintain coherency during addition, deletion, or reding of entries. Although an increasing number of cores are intended to increase throughput, lock contention can cause flow tables to be a bottleneck on controller performance and fast path scalability.

Therefore, what is needed is a robust technique to packet processing with per-CPU flow tables in a network device.

SUMMARY

These shortcomings are addressed by the present disclosure of methods, computer program products, and systems for packet processing with per-CPU flow tables in a network device.

In one embodiment, a plurality of network packets is received at an input network interface of the network device coupled to the data communication network. The network packets are stored in a plurality of network packets in a hardware queue of a plurality of hardware queues dedicated to a CPU of a plurality of CPUs in accordance with a flow assigned to the network packet.

In another embodiment, a processing path is determined for a network packet. To do so, a hash can be applied to the network packet and searching for hash result in a hash table of a plurality of hash tables. The hash table is dedicated to the CPU and each of the plurality of hash tables is dedicated to at least one CPU of the plurality of CPUs. Responsive to successfully identifying a stored hash matching the hash result in the hash table, an associated flow entry is fetched, and the network packet is forwarded to a fast processing path.

Responsive to not successfully identifying a stored hash matching the hash result in the hash table, the hash is stored in the hash table, and the network packet is forwarded to the slow processing path. The fast processing path bypasses an IP (Internet Protocol) stack traversed by the slow path. The network packet at an output network interface of the network device according to the flow entry.

Advantageously, per-CPU flow tables enhance performance of network devices, such as WLAN controllers.

BRIEF DESCRIPTION OF THE FIGURES

In the following figures, like reference numbers are used to refer to like elements. Although the following figures depict various examples of the invention, the invention is not limited to the examples depicted in the figures.

DETAILED DESCRIPTION

The present invention provides methods, computer program products, and systems for packet processing with per-CPU flow tables in a network device. One of ordinary skill in the art will recognize that many other scenarios are possible, given the present disclosure, as discussed in more detail below.

Systems for Per-CPU Packet Processing (FIGS. 1-4)

Figure 1:
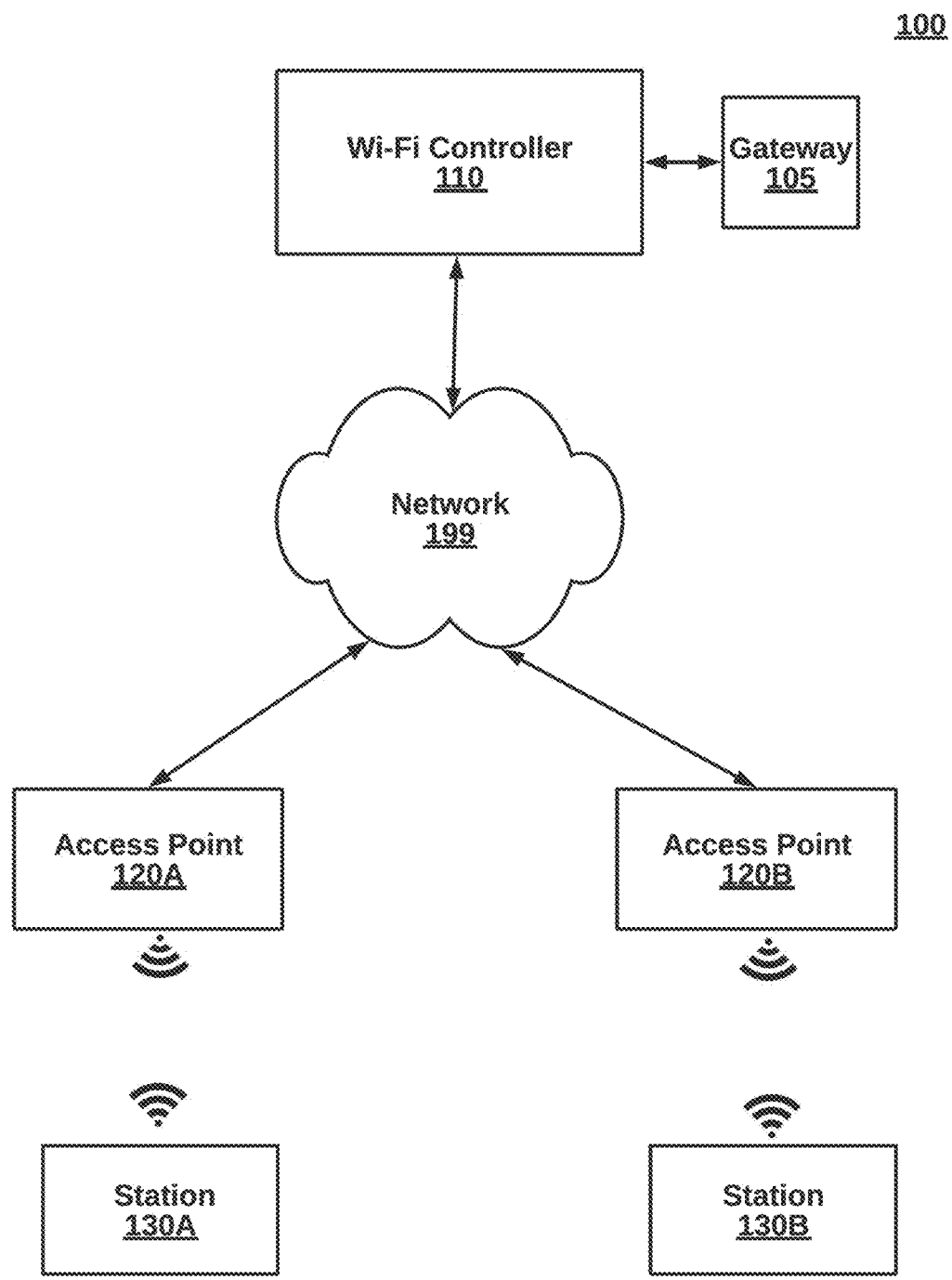
FIG. 1 is a high-level block diagram illustrating a system for packet processing with per-CPU flow tables in a network device, according to one embodiment.

FIG. 1 is a high-level block diagram illustrating a system 100 for packet processing with per-CPU flow tables in a network device, according to one embodiment. The system 100 comprises a gateway 105, a controller 110, access points 120A-B, and stations 130A-C. Many other configurations are possible. For example, additional network components can also be part of the system 100, such as firewalls, virus scanners, routers, switches, application servers, databases, and the like.

Network 199 provides a data channel for components of the system 100 with network devices, such as routers, switches, network processors, and the like. The components can use data channel protocols, such as IEEE 802.11n, 802.11ac, or other versions of the 802.11 and other wireless standards. Referring specifically to FIG. 1, the controller 110 and the access points 120A-B are each connected to the network 199, preferably over wired connections. In, turn, the stations 130A-C are coupled to the access points 120A-B over wireless connections, such as Wi-Fi.

Figure 2:
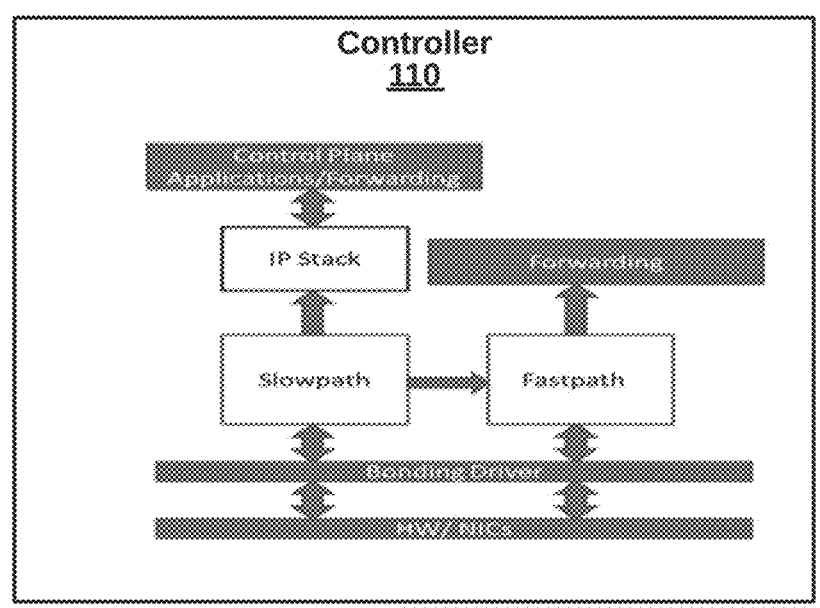
FIG. 2 is a more detailed block diagram illustrating internal components of a controller, from the system of FIG. 1, according to one embodiment.
Figure 3A:
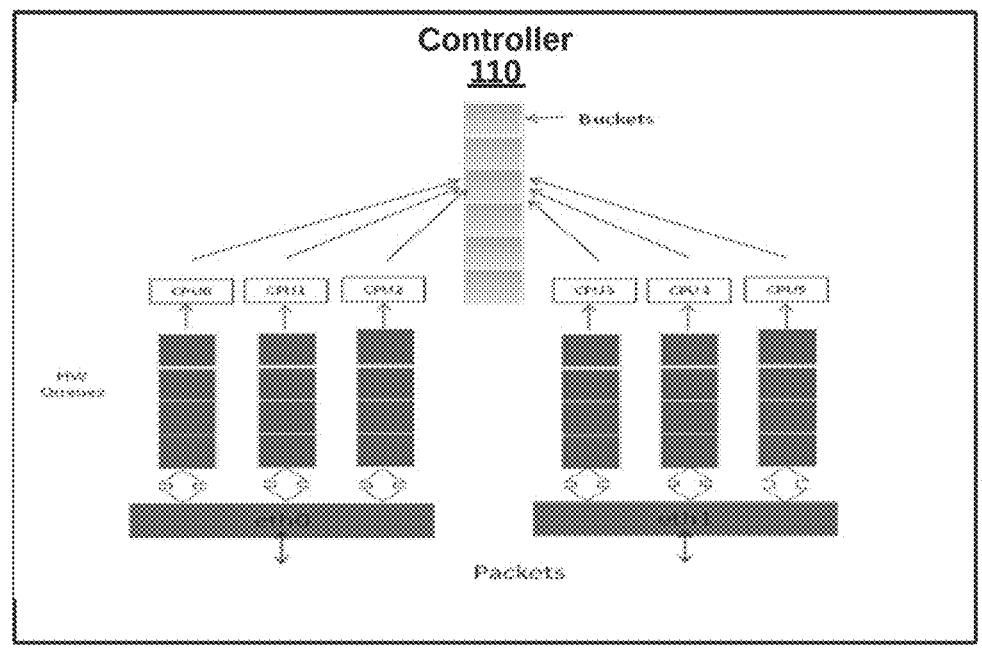
FIG. 3A is a more detailed block diagram illustrating per-CPU flow tables relative to a single flow table of FIG. 3B (prior art), according to one embodiment.
Figure 3B:
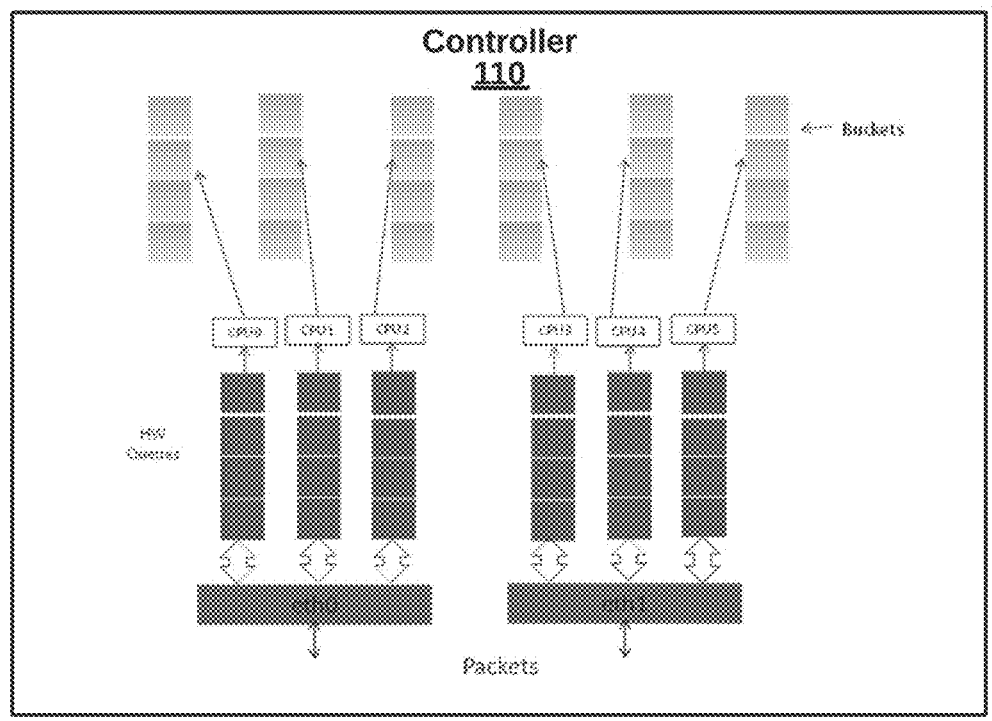

The controller 110, in an embodiment, implements per-CPU flow tables to process network packets, while reducing flow table bottlenecks. The fast path shown in FIG. 2 can bypass a Linux IP stack used to determine routing. RSS can be activated within a network interface card to pre-sort network packets by flow, each flow having an assigned queue and CPU. Rather than having one flow table for all CPUs, as shown in FIG. 3B, each CPU has a dedicated flow table, as shown in FIG. 3A. Any locks on a flow table are limited to a particular CPU rather than having all CPUs use locks on a single table.

In one case, packets traverse upstream from the stations 130A-B to the gateway 105, and downstream from the gateway 105 to the stations 130A-B. As discussed, the sources and destinations of packets tunneled form access points are often the same, and provide little insight to distinguishing network packets from each other. As a result, the inner contents are used by the controller 110 to determine the flow. Hashing is executed using XOR or other methods to search for a flow entry in a per-CPU hash table. If a flow entry is found, it is forwarded directly to a bond driver to transmit according to routing information in the flow entry. If a flow entry is not found, routing information is determined in the slow path which includes the IP stack and a flow entry is stored in the per-CPU hash table. With single read lock, the CPU consumes atomic operations and is virtually lockless. Write lock may only be required when a client gets disconnected, which occurs in limited circumstances. Coherency across per-CPU hash tables is not required, in an embodiment.

Figure 5:
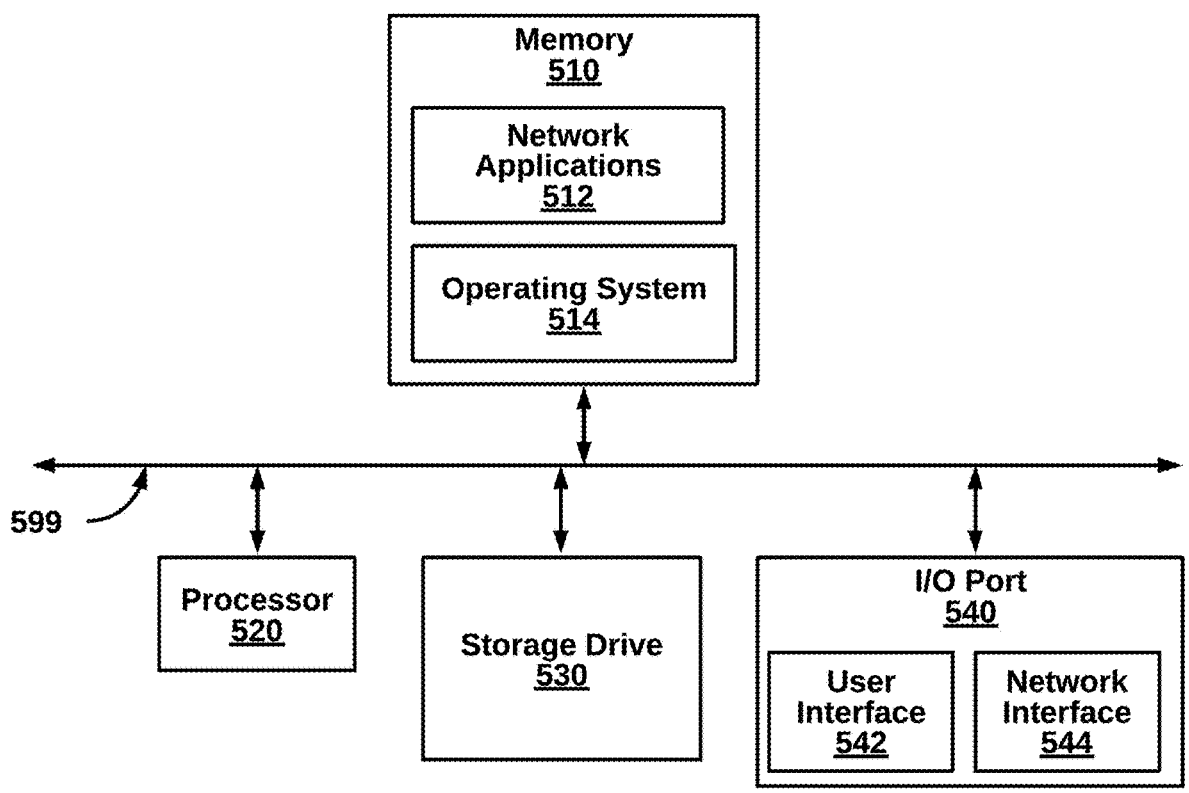
FIG. 5 is a block diagram illustrating an example computing device, according to one embodiment.

The controller 110 can be implemented in any of the computing devices discussed herein (e.g., see FIG. 5). For example, the cloud-based controller 110 can be an MC1500 or MC6000 device (e.g., modified) by Fortinet of Sunnyvale, Calif.

The access points 120A-B can tunnel packets to the controller 110 when received from the stations 130A-C.

The access points 120A,B physically include one or more individual access points implemented in any of the computing devices discussed herein (e.g., see FIG. 5). For example, the access points 120A,B can be an AP 110 or AP 433 (modified as discussed herein) by Fortinet of Sunnyvale, Calif. A network administrator can strategically place the access points 120A,B for optimal coverage area over a locale. Further embodiments of the access points 120A,B are discussed with respect to FIG. 2B.

The stations 130A-C of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 5).

Generally, the network components of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 6).

Figure 4:
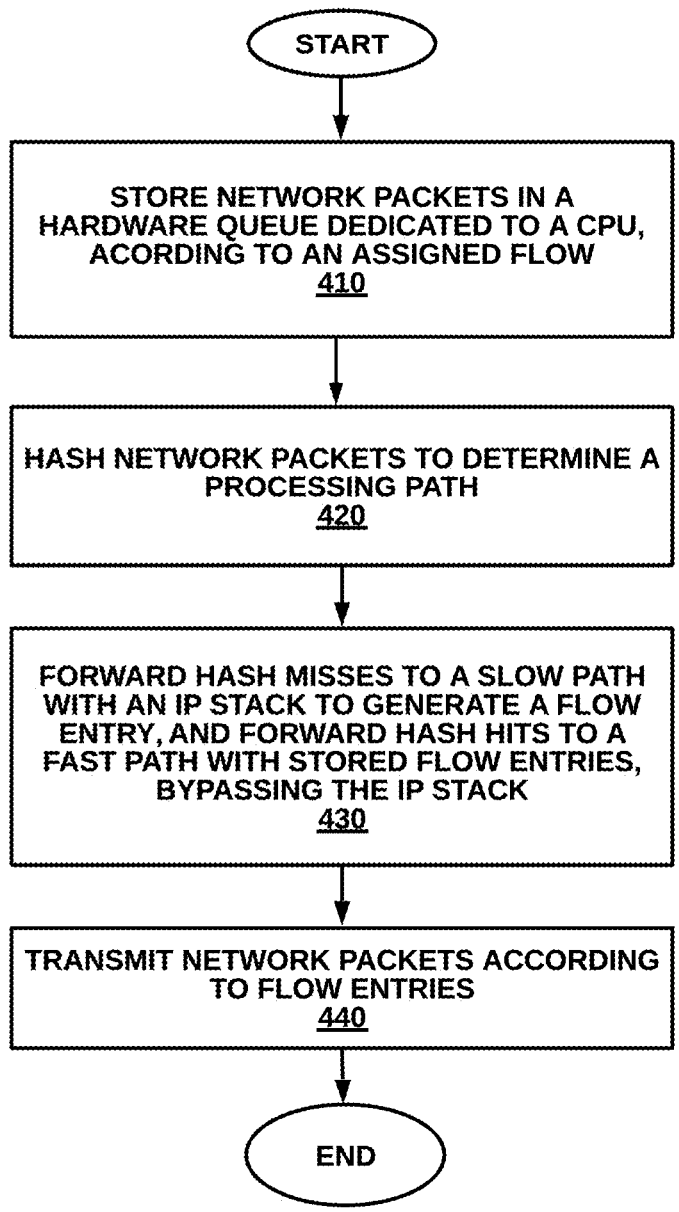
FIG. 4 is a high-level flow diagram illustrating a method for packet processing with per-CPU flow tables in a network device, according to one embodiment.

Methods for Per-CPU Packet Processing (FIG. 4)

FIG. 4 is a high-level flow diagram illustrating a method for packet processing with per-CPU flow tables in a network device, according to one embodiment. The method 400 can be implemented by the system 100 of FIG. 1 or a different system. One of ordinary skill in the art will recognize that the method 400 is non-limiting as other embodiments can have more or less steps and can be performed in a different order.

At step 410, a network packets received at a controller or other network device are stored in a hardware queue dedicated to a CPU, according to an assigned flow. At step 420, hash network packets to determine a processing path between a slow processing path with an IP stack to generate a flow entry, and a fast processing path bypassing the IP stack with stored flow entries. At step 430, transmit the network packets according to flow entries.

Generic Computing Device (FIG. 5)

FIG. 5 is a block diagram illustrating an exemplary computing device 500 for use in the system 100 of FIG. 1, according to one embodiment. The computing device 500 is an exemplary device that is implementable for each of the components of the system 100, including the emergency evacuation server 105, the controller 110, the access points 120A-B, and the stations 130A-C. The computing device 500 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 500, of the present embodiment, includes a memory 510, a processor 520, a storage drive 530, and an I/O port 540. Each of the components is coupled for electronic communication via a bus 599. Communication can be digital and/or analog, and use any suitable protocol.

The memory 510 further comprises network applications 512 and an operating system 514. The network applications 512 can include the modules of the central locationing server 110, the access points 120A,B, and the stations 130A-C, as illustrated in FIGS. 1-3. Other network applications 512 can include a web browser, a mobile application, an application that uses networking, a remote application executing locally, a network protocol application, a network management application, a network routing application, or the like.

The operating system 514 can be one of the Microsoft Windows® family of operating systems (e.g., Windows 95, 98, Me, Windows NT, Windows 2000, Windows XP, Windows XP x54 Edition, Windows Vista, Windows CE, Windows Mobile, Windows 5 or Windows 8), Linux, HP-UX, UNIX, Sun OS, Solaris, Mac OS X, Alpha OS, AIX, IRIX32, or IRIX54. Other operating systems may be used. Microsoft Windows is a trademark of Microsoft Corporation.

The processor 520 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the storage drive 530.

The storage drive 530 can be any non-volatile type of storage such as a magnetic disc, EEPROM (electronically erasable programmable read-only memory), Flash, or the like. The storage drive 530 stores code and data for applications.

The I/O port 540 further comprises a user interface 542 and a network interface 544. The user interface 542 can output to a display device and receive input from, for example, a keyboard. The network interface 544 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in a network device implemented at least partially in hardware and communicatively coupled to a data communication, for packet processing with per-CPU (central processing unit) flow tables in a network device, the method comprising the steps of:
   receiving, at an input network interface of the network device coupled to the data communication network, a plurality of network packets;
   storing a network packet from the plurality of network packets in a hardware queue of a plurality of hardware queues dedicated to a CPU of a plurality of CPUs in accordance with a flow assigned to the network packet;
   determining a processing path for a network packet comprising:
      applying a hash to the network packet and searching for hash result in a hash table of a plurality of hash tables, wherein the hash table is dedicated to the CPU and each of the plurality of hash tables is dedicated to at least one CPU of the plurality of CPUs,
      responsive to successfully identifying a stored hash matching the hash result in the hash table, fetching an associated flow entry, and forwarding the network packet to a fast processing path, and
      responsive to not successfully identifying a stored hash matching the hash result in the hash table, storing the hash in the hash table, and forwarding the network packet to the slow processing path,
      wherein the fast processing path bypasses an IP (Internet Protocol) stack traversed by the slow path; and
   transmitting, at an output network interface of the network device, the network packet according to the flow entry.

2. The method of claim 1, wherein: the plurality of packets are either received from the same source or are sent to the same destination, resulting in common headers.

3. The method of claim 1, wherein: the input network interface implements RSS (receive side scaling) to automatically steer the network packet in accordance with the flow.

4. The method of claim 1, wherein: the flow entry for upstream network packets, comprises: a VLAN tag, a source MAC, and a destination MAC.

5. The method of claim 1, wherein: the flow entry for downstream network packets, comprises: a client MAC, an access point client address, and a VLAN tag.

6. The method of claim 1, wherein: the network device is a controller managing a plurality of access points, and upstream network packets are tunneled from an access point of the plurality of access points.

7. The method of claim 1, locks between the plurality of hash tables are independent of each other.

8. A network device on a data communication network for packet processing with per-CPU (central processing unit) flow tables in a network device, the network device comprising:
   an input network interface of the network device coupled to the data communication network, to receive a plurality of network packets;
   a hardware queue of a plurality of hardware queues dedicated to a CPU of a plurality of CPUs to store a network packet from the plurality of network packets in in accordance with a flow assigned to the network packet;
   a pre-processor to determine a processing path for a network packet comprising:
      applying a hash to the network packet and searching for hash result in a hash table of a plurality of hash tables, wherein the hash table is dedicated to the CPU and each of the plurality of hash tables is dedicated to at least one CPU of the plurality of CPUs,
      responsive to successfully identifying a stored hash matching the hash result in the hash table, fetching an associated flow entry, and forwarding the network packet to a fast processing path, and
      responsive to not successfully identifying a stored hash matching the hash result in the hash table, storing the hash in the hash table, and forwarding the network packet to the slow processing path,
      wherein the fast processing path bypasses an IP (Internet Protocol) stack traversed by the slow path; and
   an output network interface of the network device, to transmit the network packet according to the flow entry.

* * * * *